(12) United States Patent
Ito (10) Patent No.: US 8,835,080 B2
(45) Date of Patent: Sep. 16, 2014

(54) ELECTROLYTE MEBRANE FORMATION METHOD, MEMBRANE-ELECTERODE ASSEMBLY, AND MEMBRANE-ELECTRODE ASSEMBLY MANUFACTURING METHOD

(75) Inventor: Naoki Ito, Yokohama (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 649 days.

(21) Appl. No.: 12/677,944

(22) PCT Filed: Mar. 26, 2009

(86) PCT No.: PCT/JP2009/001361
§ 371 (c)(1),
(2), (4) Date: Mar. 12, 2010

(87) PCT Pub. No.: WO2010/109530
PCT Pub. Date: Sep. 30, 2010

(65) Prior Publication Data
US 2011/0262834 A1   Oct. 27, 2011

(51) Int. Cl.
*H01M 8/10*     (2006.01)
*H01M 8/12*     (2006.01)
*B05D 3/02*     (2006.01)
*H01M 4/88*     (2006.01)
*H01M 4/86*     (2006.01)

(52) U.S. Cl.
CPC ............ *H01M 4/8621* (2013.01); *H01M 4/861* (2013.01); *H01M 8/124* (2013.01); *H01M 8/1213* (2013.01); *Y02E 60/521* (2013.01); *H01M 4/881* (2013.01); *H01M 4/8885* (2013.01)

USPC ......... 429/535; 429/482; 427/376.2; 427/115

(58) Field of Classification Search
USPC .............. 429/479, 483, 44, 30, 535; 427/115, 427/264
See application file for complete search history.

(56) References Cited

U.S. PATENT DOCUMENTS

| | | | |
|---|---|---|---|
| 5,342,703 A * | 8/1994 | Kawasaki et al. ............. | 429/489 |
| 2002/0177025 A1* | 11/2002 | Kushibiki et al. ............... | 429/30 |
| 2003/0021900 A1* | 1/2003 | Jacobson et al. ........... | 427/376.2 |
| 2003/0148163 A1* | 8/2003 | Fleck et al. ..................... | 429/33 |
| 2003/0207166 A1* | 11/2003 | Hara et al. ...................... | 429/41 |
| 2006/0199058 A1* | 9/2006 | Hiwatashi ........................ | 429/30 |

FOREIGN PATENT DOCUMENTS

| | | |
|---|---|---|
| JP | 11-329463 A | 11/1999 |
| JP | 2002-352816 A | 12/2002 |
| JP | 2005-251611 A | 9/2005 |
| JP | 2006-032183 A | 2/2006 |
| JP | 2006-073230 A | 3/2006 |
| JP | 2007-087746 A | 4/2007 |
| JP | 2007-149439 A | 6/2007 |
| WO | WO 2009014775 A2 * | 1/2009 |
| WO | WO 2009082402 A1 * | 7/2009 |

\* cited by examiner

*Primary Examiner* — Basia Ridley
*Assistant Examiner* — Caitlin Wilmot
(74) *Attorney, Agent, or Firm* — Kenyon & Kenyon LLP (57) ABSTRACT

A membrane-electrode assembly a solid electrolyte type-structure including a first electrode, an electrolyte membrane, and a second electrode and is formed on one single face of a porous metal support. The electrolyte membrane is obtained by firing a first electrolyte film formed on the first electrode and a second electrolyte film, which has a higher degree of fluidity than the degree of fluidity of the first electrolyte film.

6 Claims, 6 Drawing Sheets

ELECTROLYTE MEBRANE FORMATION METHOD, MEMBRANE-ELECTERODE ASSEMBLY, AND MEMBRANE-ELECTRODE ASSEMBLY MANUFACTURING METHOD

This is a 371 national phase application of PCT/JP2009/001361 filed 26 Mar. 2009, the contents of which are incorporated herein by reference.

FIELD OF THE INVENTION

The present invention relates to a method of forming an electrolyte membrane used for solid oxide fuel cells and a method of manufacturing a membrane-electrode assembly.

BACKGROUND OF THE INVENTION

A solid oxide is used for an electrolyte membrane included in solid oxide fuel cells (SOFC). Thinning the electrolyte membrane is desired for the enhanced ion permeability of the electrolyte membrane. Such thickness reduction of the electrolyte membrane, however, has difficulty in independently forming the electrolyte membrane. One known technique accordingly forms electrodes and an electrolyte membrane on a support plate made of a porous metal material.

The support plate of the metal material and the electrolyte membrane of the solid oxide have different rates of shrinkage in the course of sintering the electrolyte membrane. The different rates of sintering-induced shrinkage may cause the sintered electrolyte membrane to be detached from the support plate or may be cracked or broken on the support plate. As is known in the art, the solid oxide is shrunk in the course of sintering by 50% in volume and by 15% through 35% in length, width, and height or in respective dimensions in X, Y, and Z directions. The metal support plate, on the other hand, substantially has no shrinkage in the course of sintering.

This problem is not characteristic of the electrolyte membrane but similarly arises on the electrode formed between the metal support plate and the electrolyte membrane.

SUMMARY OF THE INVENTION

Problems to Solve

By taking into account the problems of the prior art explained above, there would be a requirement for controlling or preventing potential detachment or damage of a membrane used for solid oxide fuel cells in the course of membrane formation.

Solution to Problem

In order to accomplish at least part of the requirement mentioned above and the other relevant requirements, a first aspect of the invention is directed to an electrolyte membrane formation method. The electrolyte membrane formation method according to the first aspect forms a first layer on a first electrode formed on a porous metal support, subsequently forms a second layer, which has a higher degree of fluidity than a degree of fluidity of the first layer, on the first layer, and then fires the first layer and the second layer to complete an electrolyte membrane.

The electrolyte membrane formation method according to the first aspect forms the first layer on the first electrode formed on the porous metal support, forms the second layer on the first layer to have the higher degree of fluidity than the degree of fluidity of the first layer, and fires the first layer and the second layer to obtain the electrolyte membrane. This arrangement effectively controls or prevents potential detachment or damage of the membrane used for solid oxide fuel cells in the course of membrane formation.

In one preferable application of the electrolyte membrane formation method according to the first aspect, the second layer has a lower green density than a green density of the first layer. This application enables the second layer to have the higher degree of fluidity than the degree of fluidity of the first layer.

In another preferable application of the electrolyte membrane formation method according to the first aspect, the higher degree of fluidity of the second layer is obtained by making the second layer of a specific material having a lower green density than a green density of a material of the first layer. This application enables the second layer to have the higher degree of fluidity than the degree of fluidity of the first layer.

In still another preferable application of the electrolyte membrane formation method according to the first aspect, the higher degree of fluidity of the second layer is obtained by forming the second layer according to a specific film formation technique that lowers the green density. This application enables the second layer to have the higher degree of fluidity than the degree of fluidity of the first layer.

In another preferable application of the electrolyte membrane formation method according to the first aspect, the higher degree of fluidity of the second layer is obtained by making the second layer of a specific material having a lower sintering performance than a sintering performance of a material of the first layer. This application causes the second layer in the firing step to have the higher degree of fluidity than the degree of fluidity of the first layer.

A second aspect of the invention is directed to another electrolyte membrane formation method. The electrolyte membrane formation method according to the second aspect forms a first layer, which has a higher degree of adhesion than a degree of adhesion of a second layer, on a first electrode formed on a porous metal support, forms a second layer on the first layer, and fires the first layer and the second layer to complete an electrolyte membrane.

The electrolyte membrane formation method according to the second aspect forms the first layer on the first electrode formed on the porous metal support to have the higher degree of adhesion than the degree of adhesion of the second layer, forms the second layer on the first layer, and fires the first layer and the second layer to obtain the electrolyte membrane. This arrangement effectively controls or prevents potential detachment or damage of the membrane used for the solid oxide fuel cells in the course of membrane formation.

In one preferable application of the electrolyte membrane formation method according to the second aspect, the higher degree of adhesion of the first layer is obtained by mixing a material of the first layer with an adhesive. This application enables the first layer to have the higher degree of adhesion than the degree of adhesion of the second layer.

In another preferable application of the electrolyte membrane formation method according to the second aspect, the higher degree of adhesion of the first layer is obtained by forming the first layer according to a specific film formation technique that assures a higher degree of adhesion than a film formation technique of forming the second layer. This application enables the first layer to have the higher degree of adhesion than the degree of adhesion of the second layer.

In still another preferable application of the electrolyte membrane formation method according to the second aspect, the higher degree of adhesion of the first layer is obtained by using particles with a higher surface roughness as a material of the first layer than a surface roughness of a material of the second layer. This application enables the first layer to have the higher degree of adhesion than the degree of adhesion of the second layer.

In another preferable application of the electrolyte membrane formation method according to the second aspect, the higher degree of adhesion of the first layer is obtained by firing the first layer at a higher temperature than a firing temperature of the second layer or by firing the first layer for a longer time than the second layer. This application enables the first layer to have the higher degree of adhesion than the degree of adhesion of the second layer.

A third aspect of the invention is directed to a membrane-electrode assembly manufacturing method. The membrane-electrode assembly manufacturing method according to the third aspect forms a first electrode on a porous metal support, subsequently forms a first layer on the first electrode, and forms a second layer, which has a higher degree of fluidity than a degree of fluidity of the first layer, on the first layer. The membrane-electrode assembly manufacturing method according to the third aspect then fires the first layer and the second layer to complete an electrolyte membrane, and further forms a second layer on the electrolyte membrane.

The membrane-electrode assembly manufacturing method according to the third aspect forms the first layer on the first electrode formed on the porous metal support, forms the second layer on the first layer to have the higher degree of fluidity than the degree of fluidity of the first layer, and fires the first layer and the second layer to obtain the electrolyte membrane. This arrangement provides the membrane-electrode assembly including the electrolyte membrane that is effectively protected from any potential detachment or damage.

One modification of the membrane-electrode assembly manufacturing method according to the third aspect may be arranged to form a first electrode on a porous metal support, subsequently form a first layer, which has a higher degree of adhesion than a degree of adhesion of a second layer, on the first electrode, then form a second layer on the first layer, fire the first layer and the second layer to complete an electrolyte membrane, and further form a second layer on the electrolyte membrane. The modified membrane-electrode assembly manufacturing method according to the third aspect forms the first layer on the first electrode formed on the porous metal support to have the higher degree of adhesion than the degree of adhesion of the second layer, forms the second layer on the first layer, and fires the first layer and the second layer to obtain the electrolyte membrane. This arrangement provides the membrane-electrode assembly including the electrolyte membrane that is effectively protected from any potential detachment or damage.

A fourth aspect of the invention is directed to a membrane-electrode assembly formed on a porous metal support. The membrane-electrode assembly according to the fourth aspect includes: a first electrode formed on the porous metal support; an electrolyte membrane formed on the first electrode and obtained by firing a first layer and a second layer formed on the first electrode to have a higher degree of fluidity than a degree of fluidity of the first layer; and a second electrode formed on the electrolyte membrane.

The membrane-electrode assembly according to the fourth aspect includes the electrolyte membrane obtained by firing the first layer and the second layer having the higher degree of fluidity than the degree of fluidity of the first layer. This arrangement provides the membrane-electrode assembly including the electrolyte membrane that is effectively protected from any potential detachment or damage.

One modified structure of the membrane-electrode assembly according to the fourth aspect may be arranged to include: a first electrode formed on the porous metal support; an electrolyte membrane formed on the first electrode and obtained by firing a first layer formed on the first electrode and a second layer, where the first layer has a higher degree of adhesion than a degree of adhesion of the second layer; and a second electrode formed on the electrolyte membrane. The modified structure of the membrane-electrode assembly according to the fourth aspect includes the electrolyte membrane obtained by firing the second layer and the first layer having the higher degree of adhesion than the degree of adhesion of the second layer. This arrangement provides the membrane-electrode assembly including the electrolyte membrane that is effectively protected from any potential detachment or damage.

A fifth aspect of the invention is directed to a fuel cell. The fuel cell according to the fifth aspect includes: the membrane-electrode assembly according to the second aspect discussed above; and a pair of separators located on both ends of the membrane-electrode assembly. This arrangement provides the fuel cell with the membrane-electrode assembly including the electrolyte membrane that is effectively protected from any potential detachment or damage.

DETAILED DESCRIPTION

The electrolyte membrane formation method, the membrane-electrode assembly, and the membrane-electrode assembly manufacturing method according to the present invention are described below based on several embodiments with reference to the accompanied drawings.

Figure 1:
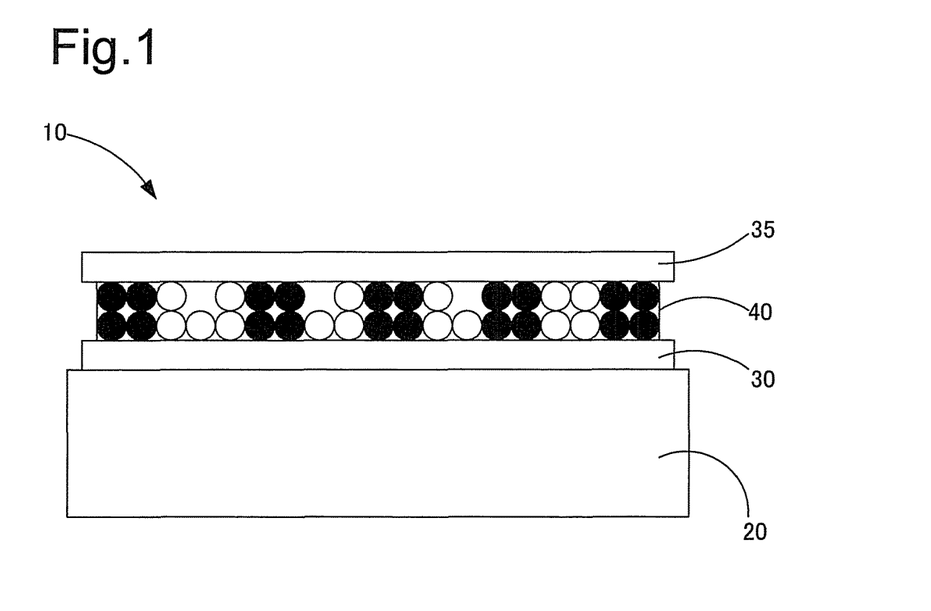
FIG. 1 is an explanatory view schematically illustrating the sectional structure of a membrane-electrode assembly in accordance with one embodiment.
Figure 2:
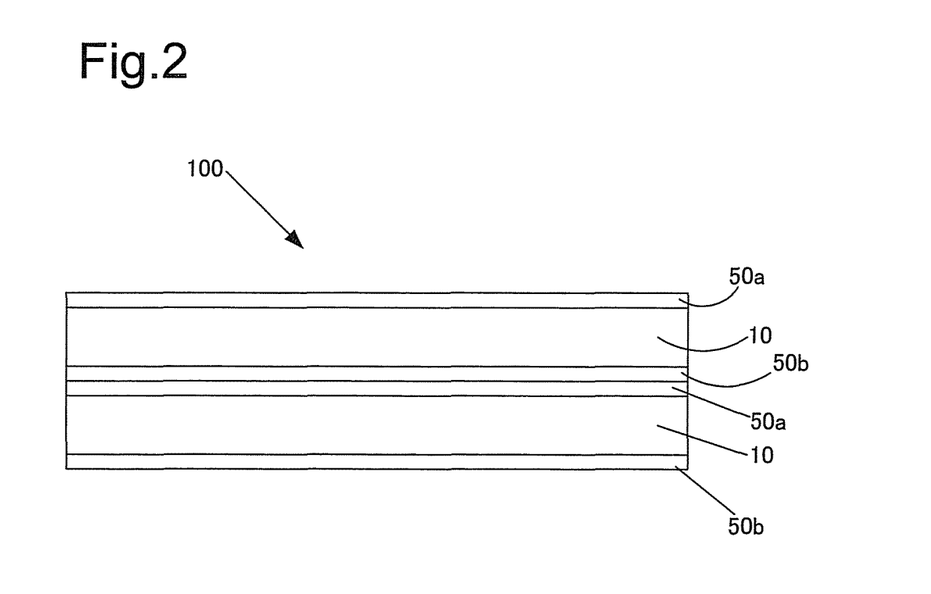
FIG. 2 is an explanatory view showing the schematic structure of a fuel cell in accordance with the embodiment.

FIG. 1 is an explanatory view schematically illustrating the sectional structure of a membrane-electrode assembly formed on a porous metal support in accordance with one embodiment. FIG. 2 is an explanatory view showing the schematic structure of a fuel cell in accordance with the embodiment. A membrane-electrode assembly 10 in accordance with the embodiment represents a solid electrolyte-type membrane-electrode assembly including a first electrode 30, an electrolyte membrane 40, and a second electrode 35 and is formed on one single face of a porous metal support 20. Specifically the first electrode 30 is formed on one face of the porous metal support 20. The electrolyte membrane 40 is formed on the first electrode 30, and the second electrode 35 is formed on the electrolyte membrane 40.

The porous metal support 20 represents a support plate made of a porous metal material. Any porous metal material having a specific porosity to allow for the function of a gas flow path may be adopted for the porous metal support 20. Typical examples of the metal material include diversity of stainless steel materials, high heat-resistant metal materials (such as Ni base alloys, Co base alloys, Fe base alloys, Inconel, Hastelloy, Stellite, and Crofer (trade name manufactured by Magnex Co., Ltd)), and ZMG (trade name manufactured by Hitachi Metals Ltd). The structure of the porous metal support may be foamed metal, sintered porous metal obtained by sintering metal particles, a non-woven fabric with interweaved or sintered metal fibers, and a metal plate with pores formed by etching, machining, or laser processing. The porous metal support may have any complex or combined structure of these structures.

The first electrode 30 is an anode and is made of a metal material such as Pt, Ni, or Cu, a cermet material such as a combination of 30% by volume of Ni and 70% by volume of YSZ (yttria stabilized zirconia) or a combination of 50% by volume of Ni and 50% by volume of GDC (gadolinium doped ceria), or any complex material of these materials. The content of Ni is generally in a range of 30 to 60% by volume.

The electrolyte membrane 40 is made of a solid oxide, for example, YSZ, GDC, SSZ (scandium stabilized zirconia), SDC (samarium doped ceria), or LSGM (lanthanum strontium gallate magnesite).

The second electrode 35 is a cathode and is made of a metal material such as Pt or Ag or a perovskite-type composite oxide such as LSM (lanthanum strontium manganate) or LSC (lanthanum strontium cobaltite).

A fuel cell 100 in accordance with the embodiment is formed as a stack of multiple unit cells, where each unit cell includes the membrane-electrode assembly 10 formed on the porous metal support 20 and located between a pair of separators 50a and 50b. End plates (not shown) are provided on both ends of the fuel cell stack and are bound by means of clamping members to securely fasten the fuel cell stack in its stacking direction. Each of the separators 50 other than those located on both the ends of the fuel cell stack may be shared by two membrane-electrode assemblies 10 adjacent to each other. In this application, the separators 50a and 50b adjacent to each other in FIG. 2 forms one integral separator.

Method of Manufacturing Membrane-Electrode Assembly

Figure 3:
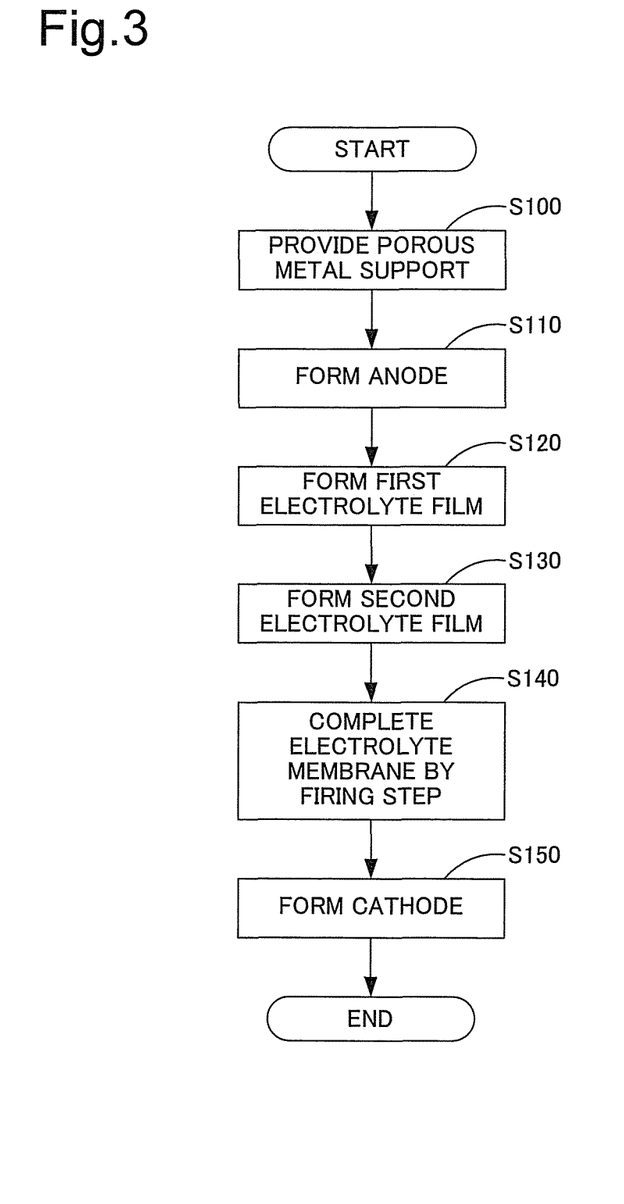
FIG. 3 is a flowchart showing a membrane-electrode assembly manufacturing method including an electrolyte membrane formation method in accordance with the embodiment.

FIG. 3 is a flowchart showing a membrane-electrode assembly manufacturing method including an electrolyte membrane formation method in accordance with the embodiment. The manufacturing method provides the porous metal support 20 (step S100) and forms the first electrode 30 as the anode on one face of the porous metal support 20 (step S110). The first electrode 30 is formed by coating one face of the porous metal support 20 with any of the materials explained above. One typical technique adopted for such film formation applies slurry made of the above material on one face of the porous metal support 20 by paste application or screen printing and sinters the applied slurry. Alternatively any of other diverse techniques including a sputtering technique of sputtering the above material onto one face of the porous metal support 20, a deposition technique such as physical vapor deposition or PVD, and a thermal spraying technique may be used for the film formation.

The manufacturing method forms a first electrolyte film on the first electrode 30 as the anode (step S120) and subsequently forms a second electrolyte film on the first electrolyte film (step S130). In this embodiment, the first electrolyte film and the second electrolyte film are formed in such a manner that the second electrolyte film has a higher degree of fluidity than the degree of fluidity of the first electrolyte film and the first electrolyte film has a higher degree of adhesion than the degree of adhesion of the second electrolyte film. The detailed methods of forming the first electrolyte film and the second electrolyte film will be discussed later.

The manufacturing method fires the first electrolyte film and the second electrolyte film to complete an electrolyte membrane (step S140). Namely the electrolyte membrane of this embodiment is formed by the firing step.

The manufacturing method forms the second electrode 35 as the cathode on the electrolyte membrane (step S150) to obtain the membrane-electrode assembly 10. The second electrode 35 is formed by the same method as the method of forming the first electrode. The fuel cell 100 is prepared by locating the obtained membrane-electrode assembly 10 between the pair of separators 50a and 50b or by stacking multiple membrane-electrode assemblies respectively interposed between the pair of separators 50a and 50b.

First Electrolyte Membrane Formation Method

Figure 4:
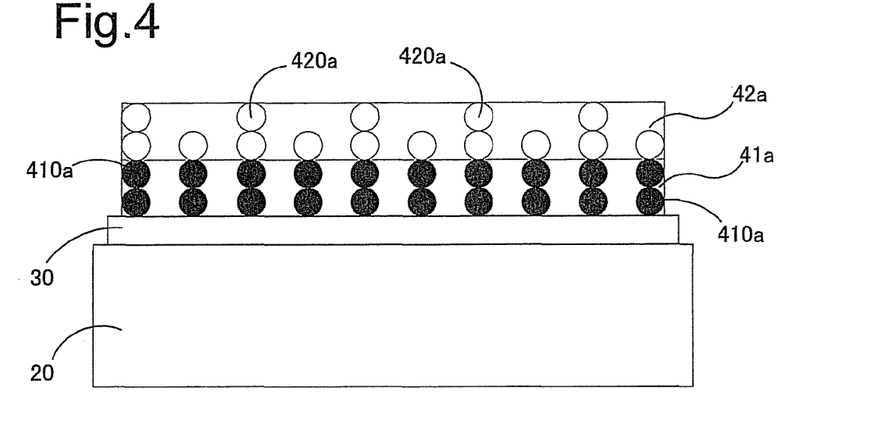
FIG. 4 is an explanatory view schematically showing the state of electrolyte films prior to a firing step in a first procedure adopted for a first electrolyte membrane formation method in accordance with the embodiment.
Figure 5:
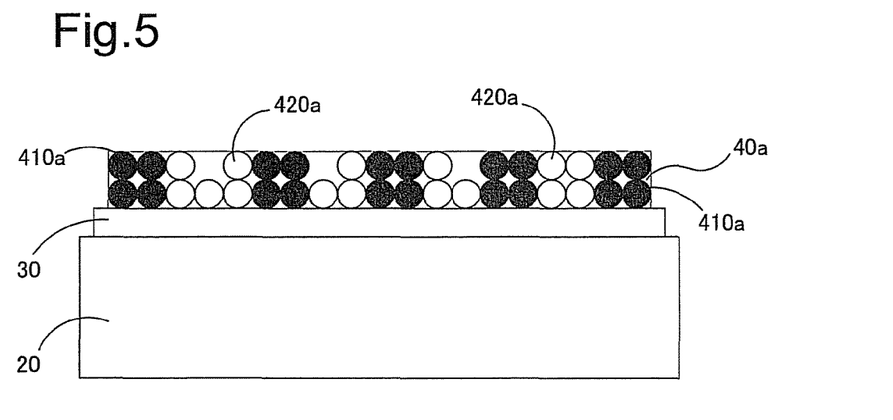
FIG. 5 is an explanatory view schematically showing the state of a resulting electrolyte membrane after the firing step in the first procedure adopted for the first electrolyte membrane formation method in accordance with the embodiment.
Figure 6:
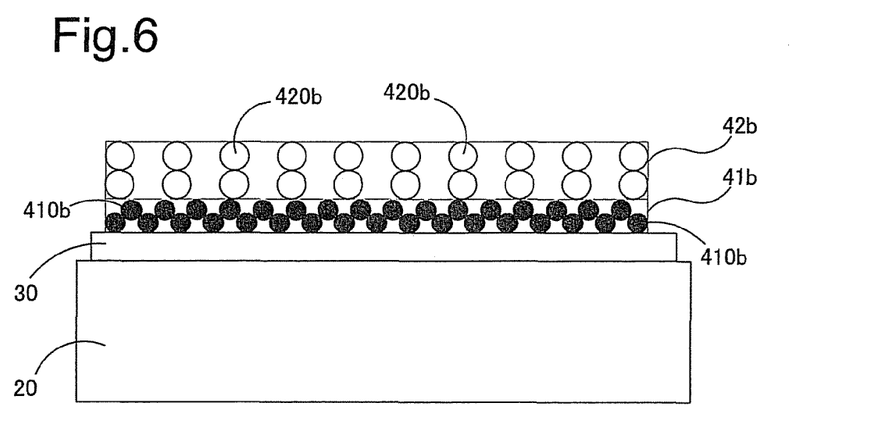
FIG. 6 is an explanatory view schematically showing the state of electrolyte films prior to a firing step in a second procedure adopted for the first electrolyte membrane formation method in accordance with the embodiment.
Figure 7:
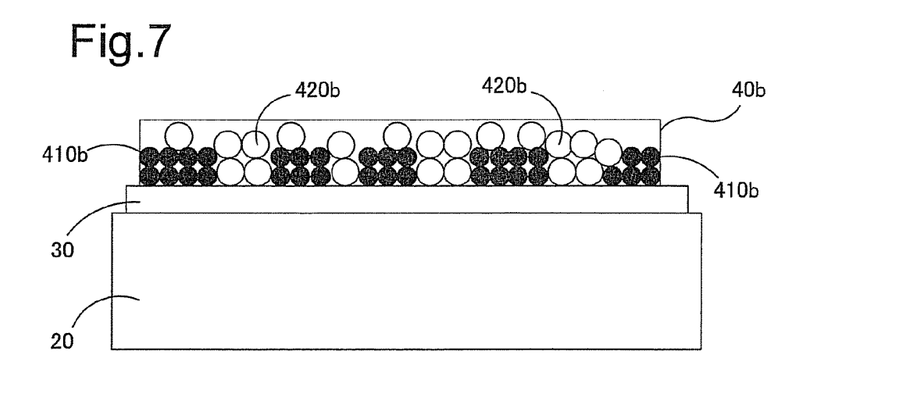
FIG. 7 is an explanatory view schematically showing the state of a resulting electrolyte membrane after the firing step in the second procedure adopted for the first electrolyte membrane formation method in accordance with the embodiment.

FIG. 4 is an explanatory view schematically showing the state of electrolyte films prior to a firing step in a first procedure adopted for a first electrolyte membrane formation method in accordance with the embodiment. FIG. 5 is an explanatory view schematically showing the state of a resulting electrolyte membrane after the firing step in the first procedure adopted for the first electrolyte membrane formation method in accordance with the embodiment. FIG. 6 is an explanatory view schematically showing the state of electrolyte films prior to a firing step in a second procedure adopted for the first electrolyte membrane formation method in accordance with the embodiment. FIG. 7 is an explanatory view schematically showing the state of a resulting electrolyte membrane after the firing step in the second procedure adopted for the first electrolyte membrane formation method in accordance with the embodiment.

The method of forming the first electrolyte membrane is characterized by that a second electrolyte film 42a has a higher degree of fluidity than the degree of fluidity of a first electrolyte film 41a in a film formation state prior to a firing step. As is clearly understood by those skilled in the art, the fluidity is expressible by the easiness of the flow of material particles constituting an electrolyte membrane. The high fluidity leads to the high mobility (the greater easiness of the flow) of the particles in the course of sintering, whereas the low fluidity leads to the low mobility (the less easiness of the flow) of the particles in the course of sintering. The fluidity can be quantified in numerical rating in a comparable manner by a known method in the art. It is desirable in this embodiment to compare the degrees of fluidity under the firing temperature. In this embodiment, the construction material of the second electrolyte film 42a is required to have at least the high fluidity relative to the fluidity of the construction material of the first electrolyte film 41a. Such characteristic is obtainable by any of several methods discussed below.

(1) One available method causes the first electrolyte film 41a and the second electrolyte film 42a to have different green densities or the densities prior to the firing step. This method is described with reference to FIGS. 4 and 5. This method forms the second electrolyte film 42a in such a manner that the second electrolyte film 42a has a lower density than the density of the first electrolyte film 41a formed directly on the first electrode 30 formed on the porous metal support 20 as shown in FIG. 4. In the drawing of FIG. 4, circles schematically represent the material particles, and the less number of circles represents the lower density.

The lower density of the second electrolyte film 42a causes second material particles 420a constituting the second electrolyte film 42a to have the higher degree of fluidity than the degree of fluidity of first material particles 410a constituting the first electrolyte film 41a. In the firing step, the second material particles 420a are moved (flowed) into vacant spaces that are not covered with the first material particles 410a. One face of the first electrode 30 is thus fully covered with either the first material particles 410a or the second material particles 420a sintered to form an electrolyte membrane 40a. Namely the firing step changes a raw electrolyte membrane consisting of the first electrolyte film 41a and the second electrolyte film 42a into the sintered electrolyte membrane 40a having a shorter dimension in a vertical direction (in a film thickness direction of the first and the second electrolyte films 41a and 42a) but an unchanged dimension in a horizontal direction (in a plane parallel to the face of the first electrode 30). This arrangement desirably controls or prevents potential cracking of the electrolyte membrane 40a, which may be caused by the non-coverage of some areas on the surface of the first electrode 30 (that is, the contact face with the first electrolyte film 41a) with the first material particles 410a. The low mobility of the first material particles 410a assures the sufficient adhesion of the electrolyte membrane 40a to the first electrode 30, thus controlling or preventing potential detachment of the sintered electrolyte membrane 40a from the first electrode 30. The first electrolyte film 41a is formed to have a sufficient level of adhesion to the first electrode 30.

Any of the following procedures may be adopted to lower the green density of the second electrolyte film 42a than the green density of the first electrolyte film 41a.

One procedure makes the first electrolyte film 41a formed on the first electrode 30 subjected to CIP (cold isostatic pressing) to increase the density of the first electrolyte film 41a and subsequently forms the second electrolyte film 42a on the processed first electrolyte film 41a.

Another procedure adopts a film formation technique of increasing the green density, for example, colloidal spraying, for film formation of the first electrolyte film 41a, while adopting a film formation technique of decreasing the green density, for example, screen printing, for film formation of the second electrolyte film 42a.

Another procedure adopts a film formation technique using an additive such as a binder or a pore former and adds a greater amount of the additive to the construction material of the second electrolyte film 42a than the amount of the additive added to the construction material of the first electrolyte film 41a.

Another procedure uses the material particles 410a made of a mixture of small-diameter particles and large-diameter particles for the first electrolyte film 41a to increase the green density of the first electrolyte film 41a, while using the material particles 420a made of only large-diameter particles for the second electrolyte film 42a to decrease the green density of the second electrolyte film 42a.

(2) Another available method uses, for the construction material of the second electrolyte film 42a, material particles with the higher degree of sphericity than the degree of sphericity of the material particles of the first electrolyte film 41a. As is well known to those skilled in the art, the particles in a specific shape have the better fluidity than the particles in a non-specific shape. Using, for the second material particles 420a, particles in a spherical shape or particles having a shape closer to the spherical shape than the first material particles 410a enables the second material particles 420a to have the higher degree of fluidity than the degree of fluidity of the first material particles 410a. This leads to the higher fluidity of the second electrolyte film 42a than the fluidity of the first electrolyte film 41a and thus effectively controls or prevents potential cracking of the fired electrolyte membrane 40a and detachment of the electrolyte membrane 40a from the first electrode 30.

(3) Another available method adds a sintering agent to the construction material of the second electrolyte film 42a to induce liquid phase sintering. Addition of the sintering agent induces the liquid phase sintering of the second electrolyte film 42a in the course of sintering and ensures the easiness of the flow of the second material particles 420a, thus enhancing the fluidity of the second electrolyte film 42a. This method gives the fired electrolyte membrane 40a that is protected from any cracking or detachment from the first electrode 30. Typical examples of the sintering agent include various oxides, such as $Fe_2O_3$, $Co_3O_4$, $Al_2O_3$, MgO, and $Y_2O_3$.

(4) Another available method uses, for the construction material of the second electrolyte film 42a, a material with a lower sintering performance than the sintering performance of the material of the first electrolyte film 41a. The material with the lower sintering performance is defined as a material giving a sintered body that has a lower relative density than the density of a sintered body made from a material with a higher sintering performance under fixed sintering conditions (temperature, atmosphere, and time). Using the material with the lower sintering performance for the second electrolyte film 42a enables the second electrolyte film 42a (the second material particles 420a) to be moved and flowed even after completed sintering of the first electrolyte film 41a and to fill vacant spaces between the occupied spaces of the sintered first electrolyte film 41a. This method gives the fired electrolyte membrane 40a that is protected from any cracking or detachment from the first electrode 30.

Any of concrete methods discussed below may be performed to use, for the construction material of the second electrolyte film 42a, the material with the lower sintering performance than the sintering performance of the material of the first electrolyte film 41a.

One method uses different materials for the construction material of the first electrolyte film 41a and for the construction material of the second electrolyte film 42a. In one concrete example, the construction material of the first electrolyte film 41a may be GDC sintered at about 1100° C., and the construction material of the second electrolyte film 42a may be YSZ sintered at about 1350° C.

Another method uses materials having an identical composition but different particle sizes to provide the first material particles 410a of the smaller particle diameter and the second material particles 420a of the greater particle diameter. This method is explained with reference to FIGS. 6 and 7. As shown in FIG. 6, this method uses particles having the smaller particle diameter than the particle diameter of second material particles 420b constituting a second electrolyte film 42b, for first material particles 410b constituting a first electrolyte film 41b directly formed on the first electrode 30 formed on the porous metal support 20. This causes the first electrolyte film 41b made of the first material particles 410b of the smaller particle diameter to be sintered at an earlier timing and enables the second material particles 420b to be moved into and sintered in vacant spaces between the occupied spaces of the sintered first material particles 410b. This method gives a fired electrolyte membrane 40b that is protected from any cracking or detachment from the first electrode 30.

Another method adds a sintering inhibitor to the construction material of the second electrolyte layer 42b. The sintering inhibitor suppresses (inhibits) the second electrolyte layer 42b from being sintered. Even when one identical material is used for both the construction material of the first electrolyte layer 41a and the construction material of the second electrolyte layer 42a, addition of the sintering inhibitor causes the first electrolyte film 41b to be sintered at a relatively earlier timing and enables the second electrolyte film 42b to maintain its fluidity after completed sintering of the first electrolyte film 41b. Typical examples of the sintering inhibitor include $BaCO_3$, C (carbon), phosphates ($YPO_4$), and $ZrO_2$.

Second Electrolyte Membrane Formation Method

Figure 8:
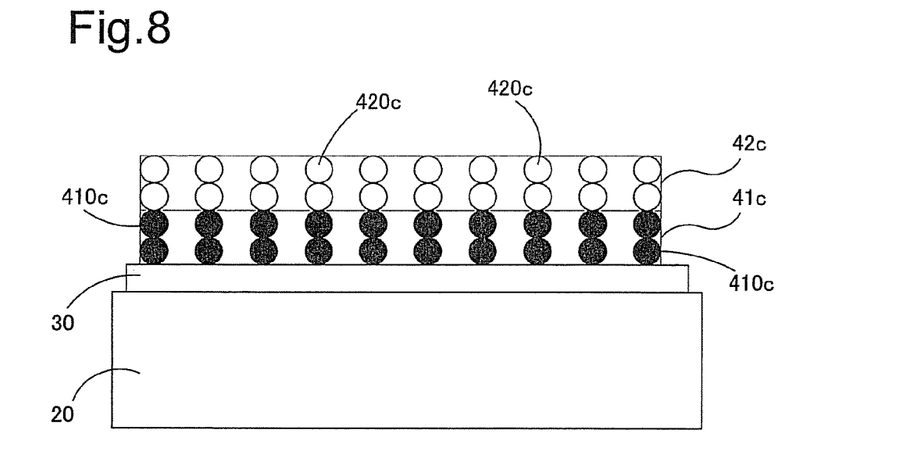
FIG. 8 is an explanatory view schematically showing the state of electrolyte films prior to a firing step in a first procedure adopted for a second electrolyte membrane formation method in accordance with the embodiment.
Figure 9:
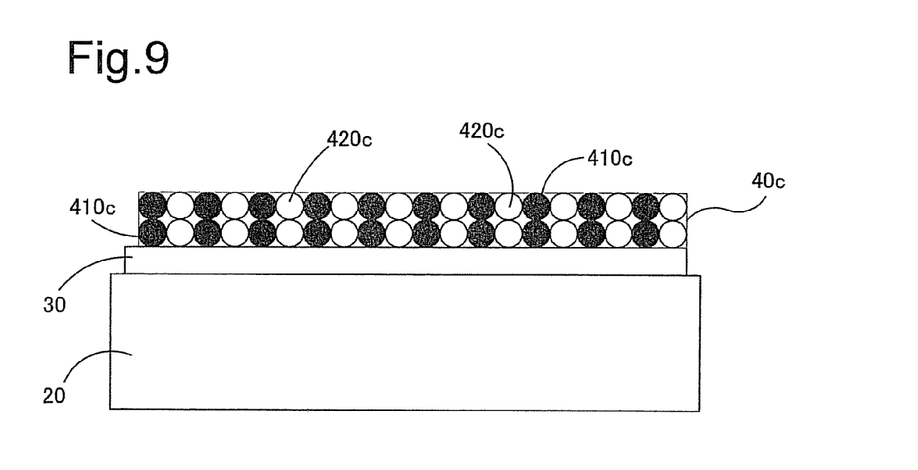
FIG. 9 is an explanatory view schematically showing the state of a resulting electrolyte membrane after the firing step in the first procedure adopted for the second electrolyte membrane formation method in accordance with the embodiment.

FIG. 8 is an explanatory view schematically showing the state of electrolyte films prior to a firing step in a first procedure adopted for a second electrolyte membrane formation method in accordance with the embodiment. FIG. 9 is an explanatory view schematically showing the state of a resulting electrolyte membrane after the firing step in the first procedure adopted for the second electrolyte membrane formation method in accordance with the embodiment. The first electrode 30 and the porous metal support 20 have the same structures as those discussed above and are thus expressed by the same numerals with no specific explanation here.

The second electrolyte membrane formation method is characterized by that the first electrolyte film is formed to have the higher degree of adhesion than the degree of adhesion of the second electrolyte film. The adhesion is expressible by the difficulty in detachment from an object to be contacted, for example, the first electrode 30. In this embodiment, the construction material of the first electrolyte film is required to have at least the high adhesion relative to the adhesion of the construction material of the second electrolyte film. The adhesion can be quantified in numerical rating in a comparable manner by a known method in the art. It is desirable in this embodiment to compare their degrees of adhesion under the firing temperature. Such characteristic is obtainable by any of several methods discussed below.

(1) One available method forms a first electrolyte film 41c by a film formation technique of assuring the high adhesion. For example, the first electrolyte film 41c is formed by PLD (pulse later deposition), sputtering, or thermal spraying, whereas a second electrolyte film 42c is formed by colloidal spraying or screen printing. The first electrolyte film 41c shown in FIG. 8 may be formed by sputtering, and the second electrolyte film 42c may be formed by screen printing. As shown in FIG. 9, first material particles 410c constituting the first electrolyte film 41c are kept stationary with no motion (flow) (or with little motion) and sintered in the stationary state. On the other hand, second materials particles 420c constituting the second electrolyte film 42c are moved into and sintered in vacant spaces between the occupied spaces of the sintered first material particles 410c.

The substantially no mobility of the first material particles 410c assures the sufficient adhesion of a sintered electrolyte membrane 40c to the first electrode 30, thus effectively controlling or preventing potential detachment of the sintered electrolyte membrane 40c from the first electrode 30. This arrangement desirably controls or prevents potential cracking of the electrolyte membrane 40c, which may be caused by the non-coverage of some areas on the surface of the first electrode 30 (that is, the contact face with the first electrolyte film 41c) with the first material particles 410c. The second electrolyte film 42c is formed to have a sufficient level of fluidity to fill the vacant spaces between the occupied spaces of the sintered first electrolyte film 41c.

(2) Another available method adds an adhesive to only the construction material of the first electrolyte film 41c. For example, addition of crystallized glass as an adhesive to only the construction material of the first electrolyte film 41c enables the first material particles 410c to be sintered in the state of adhering to or stuck to the first electrode 30. The second material particles 420c are moved into and sintered in vacant spaces between the occupied spaces of the sintered first material particles 410c. This method gives the fired electrolyte membrane 40c that is protected from any cracking or detachment from the first electrode 30.

(3) Another available method uses angular particles (rough-surfaced particles) for the first material particles 410c constituting the first electrolyte film 41c. The corners or projections of the first material particles 410c given as their physical characteristic are cut into the first electrode 30 to enhance the adhesion of the first electrolyte film 41c to the first electrode 30. The second material particles 420 are flowed and moved into vacant spaces that are not covered with the first material particles 410c. This method gives the fired electrolyte membrane 40c that is protected from any cracking or detachment from the first electrode 30.

(4) Another available method increases the firing temperature of the first electrolyte film 41c. The increased firing temperature shortens the firing time of the first electrolyte film 41c, thus enhancing the adhesion of the first electrolyte film 41c to the first electrode 30. The increased firing temperature causes the first electrolyte film 41c to be sintered earlier than the second electrolyte film 42c and accelerates the sintering reaction of the construction materials of the first electrolyte film and the first electrode. This enables the first electrolyte film to be securely bound to the first electrode and enhances the adhesion of the first electrolyte film to the first electrode. One concrete procedure of this method locates a heater in contact with the porous metal support 20 to heat the first electrolyte film 41c via the first electrode 30 and thereby fires the first electrolyte film 41c at a higher temperature than the atmospheric temperature in the course of sintering (that is, the firing temperature of the second electrolyte film 42c).

As described above, the electrolyte membrane formation method, the membrane-electrode assembly, the membrane-electrode assembly manufacturing method, and the fuel cell in accordance with this embodiment effectively control or prevent potential cracking of the fired electrolyte membrane 40a and detachment of the electrolyte membrane 40a from the first electrode 30. The first electrolyte membrane formation method makes the degree of fluidity of the second electrolyte film 42a higher than the degree of fluidity of the first electrolyte film 41a. The high fluidity enables the second electrolyte film 42a to be flowed and moved into vacant spaces between the occupied spaces of the first electrolyte film 41a sintered in adhesion to the first electrode 30. The resulting electrolyte membrane 40a thus enables the whole contact face of the first electrode 30 to be covered with either the first electrolyte film 41a or the second electrolyte film 42a. This arrangement effectively controls or prevents potential cracking of the fired electrolyte membrane 40a and detachment of the electrolyte membrane 40a from the first electrode 30.

The second electrolyte membrane formation method of the embodiment makes the degree of adhesion of the first electrolyte film 41c higher than the degree of adhesion of the second electrolyte film 42c and thereby enhances the adhesion of the first electrolyte film 41c to the first electrode 30. The second electrolyte film 42c is moved and flowed into the vacant spaces that are not covered with the first electrolyte film 42c. This arrangement effectively controls or prevents potential cracking of the fired electrolyte membrane 40c and detachment of the electrolyte membrane 40c from the first electrode 30.

Figure 10:
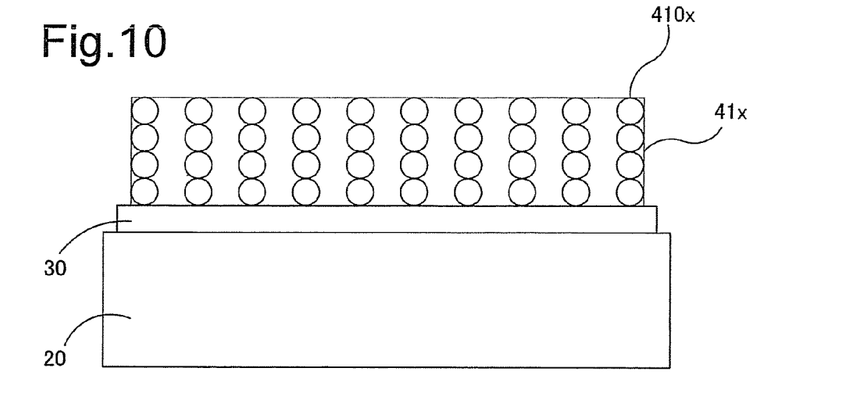
FIG. 10 is an explanatory view schematically showing the state of an electrolyte film prior to a firing step in a prior art electrolyte membrane formation method.
Figure 11:
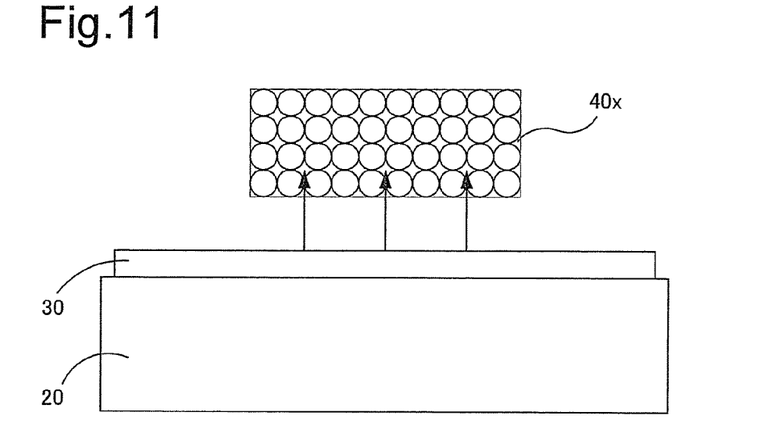
FIG. 11 is an explanatory view schematically showing the state of one resulting electrolyte membrane after the firing step in the prior art electrolyte membrane formation method.
Figure 12:
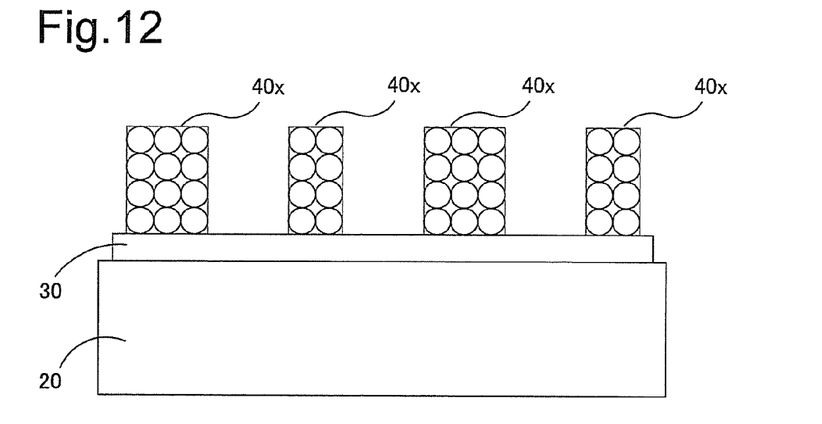
FIG. 12 is an explanatory view schematically showing the state of another resulting electrolyte membrane after the firing step in the prior art electrolyte membrane formation method.

The comparison of the embodiment with the prior art method is described below. FIG. 10 is an explanatory view schematically showing the state of an electrolyte film prior to a firing step in a prior art electrolyte membrane formation method. FIG. 11 is an explanatory view schematically showing a first state of a resulting electrolyte membrane after the firing step in the prior art electrolyte membrane formation method. FIG. 12 is an explanatory view schematically showing a second state of the resulting electrolyte membrane after the firing step in the prior art electrolyte membrane formation method.

As shown in FIG. 10, the prior art electrolyte membrane formation method forms a single-layered homogeneous electrolyte film 41x on the first electrode 30 and fires the electrolyte film 41x on the first electrode 30. Some problem then arises after the firing step as shown in FIG. 11 or FIG. 12. In the illustrated example of FIG. 11, a material having high fluidity (low adhesion to a porous metal support) is used for the construction material of an electrolyte membrane. The whole electrolyte film 41x is flowed in the course of sintering to give a sintered electrolyte membrane 40x shrunk in the horizontal direction. The sintered electrolyte membrane 40x does not have cracking but has undesirably lowered adhesion to the first electrode to be readily detached from the first electrode 30 due to the flow of material particles 410x constituting the electrolyte film 41x.

In the illustrated example of FIG. 12, a material having high adhesion to the porous metal support (low fluidity) is used for the construction material of an electrolyte membrane. The electrolyte film 41x is not flowed in the course of sintering but adheres to the first electrode 30 to give a sintered electrolyte membrane 40x with cracks. The resulting electrolyte membrane 40x keeps the sufficient adhesion to the first electrode 30 and is thus not readily detached from the first electrode 30. But the low fluidity of the material particles 410x constituting the electrolyte film 41x does not allow the whole face of the first electrode 30 to be covered with the electrolyte membrane 40x. The sintered electrolyte membrane 40x accordingly has some damage, such as cracks.

Neither of the prior art electrolyte membranes shown in FIGS. 11 and 12 is suitably used for the membrane-electrode assembly. It would thus be highly required to provide a method of forming an electrolyte membrane that is protected from cracking and detachment.

The first electrolyte membrane formation method of the embodiment forms the two-layered structure including the first electrolyte film 41a and the second electrolyte film 42a having the higher degree of fluidity than that of the first electrolyte film 41a and subsequently fires the two-layered electrolyte films to complete an electrolyte membrane. Namely the two-layered structure prior to the firing step consists of the first layer and the second layer having different degrees of fluidity. While the first electrolyte film 41a having the low fluidity is sintered in discrete adhesion to the first electrode 30, the vacant spaces between the occupied spaces of the sintered first electrolyte film 41a are filled with the second electrolyte film 42a having the high fluidity to complete the electrolyte membrane 40a. This arrangement effectively controls or prevents potential damage of the electrolyte membrane 40a.

The second electrolyte membrane formation method of the embodiment forms the two-layered structure including the second electrolyte film 42c and the first electrolyte film 41c having the higher degree of adhesion than that of the second electrolyte film 42c and subsequently fires the two-layered electrolyte films to complete an electrolyte membrane. Namely the two-layered structure prior to the firing step consists of the first layer and the second layer having different degrees of adhesion. This effectively enhances the adhesion of the first electrolyte film 41c to the first electrode 30 and accordingly controls or prevents potential detachment of the resulting electrolyte membrane 40c from the first electrode 30. The vacant spaces between the occupied spaces of the sintered first electrolyte film 41c are filled with the second electrolyte film 42c having the high fluidity to complete the electrolyte membrane 40c.

The electrolyte membrane 40 formed by either the first formation method or the second formation method discussed above is used to manufacture the membrane-electrode assembly 10 or the fuel cell 100. The use of the electrolyte membrane 40 protected from potential damage or detachment from the first electrode 30 enables the membrane-electrode assembly 10 or the fuel cell 100 to have desired performances and improves the yield of the membrane-electrode assembly 10 or the fuel cell 100.

Other Aspects

Figure 13:
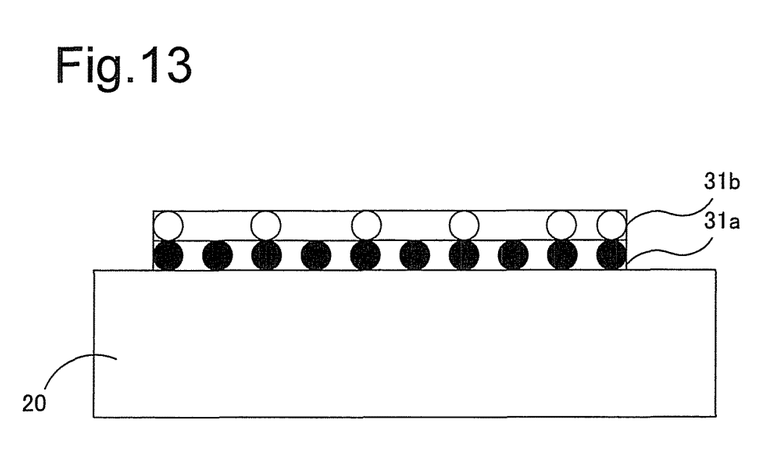
FIG. 13 is an explanatory view schematically showing the state of electrolyte layers prior to a firing step in an electrode formation method in accordance with another embodiment.
Figure 14:
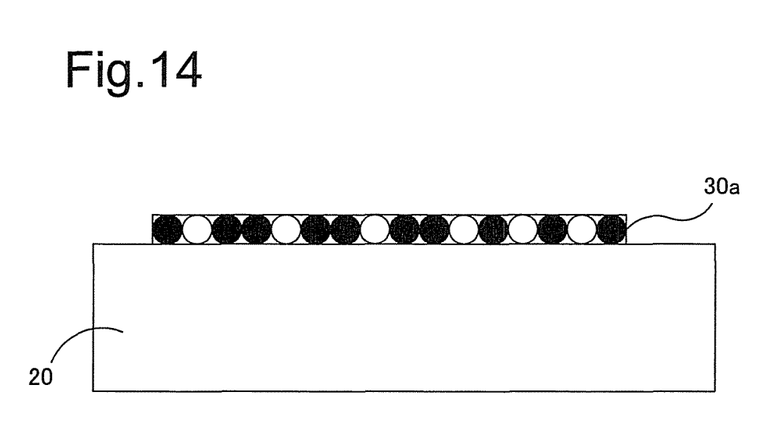
FIG. 14 is an explanatory view schematically showing the state of a resulting electrode after the firing step in the electrode formation method in accordance with the embodiment.

The methods of forming the electrolyte membrane are discussed in the above embodiment. The technique of the invention is also applicable to formation of the first electrode 30 directly on the porous metal support 20. FIG. 13 is an explanatory view schematically showing the state of electrolyte layers prior to a firing step in an electrode formation method in accordance with another embodiment. FIG. 14 is an explanatory view schematically showing the state of a resulting electrode after the firing step in the electrode formation method in accordance with the embodiment.

The electrode formation method of this embodiment forms the two-layered structure including a first layer 31*a* and a second layer 31*b* and subsequently fires the two-layered structure to obtain a sintered first electrode 30*a*. The electrode generally contains metal components and has a lower rate of sintering shrinkage than the solid electrolyte. The electrode is thus not readily detached from the porous metal support 20. The electrode of some composition may, however, have a relatively high rate of sintering shrinkage. The electrode formation method of this embodiment is suitable in this latter case. The method forms the first layer 31*a* and the second layer 31*b* having the higher degree of fluidity than that of the first layer 31*a* as shown in FIG. 13 and fires the first layer 31*a* and the second layer 31*b* to obtain the sintered first electrode 30*a* of FIG. 14 that is protected from potential damage and detachment from the porous metal support 20.

One modification of the electrode formation method may increase the adhesion of the first layer 31*a*, instead of increasing the fluidity of the second layer 31*b*. Similarly to the discussion of the above embodiment, this modified method enhances the adhesion of the first electrode 30*a* to the porous metal support 20 and controls or prevents potential cracking or damage of the first electrode 30*a*.

The technique of the invention may be actualized as a film formation method that forms a first layer on a porous metal support, forms a second layer having the higher degree of fluidity than that of the first layer on the first layer, and fires the first layer and the second layer to complete a first film structure. The technique of the invention may also be actualized by an electrolyte membrane formation method that forms the first layer on a first electrode formed on the porous metal support.

(1) The electrolyte membrane discussed in the above embodiment has the two-layered structure consisting of the first electrolyte film and the second electrolyte film. The two-layered structure is, however, not essential and the electrolyte membrane may have a three or more-layered structure consisting of three or a greater number of electrolyte films. In this modified structure, for example, the electrolyte film farther away from the first electrode may be formed to have the higher fluidity. Alternatively the electrolyte film closer to the first electrode may be formed to have the higher adhesion. In another example, the electrolyte film in direct contact with the first electrode may be formed to have the high adhesion. Alternatively the electrode films other than the electrolyte film in direct contact with the first electrode may be formed to have the high fluidity.

(2) In the embodiment discussed above, the characteristics of the first electrolyte film and the second electrolyte film are defined by the fluidity and the adhesion. The characteristics of the first electrolyte film and the second electrolyte film may be defined by the rates of sintering shrinkage in the process of sintering the respective electrolyte films to complete an electrolyte membrane. In this case, the first electrolyte film may be made of a material having a lower rate of sintering shrinkage than the rate of sintering shrinkage of the material of the second electrolyte film. The electrolyte membrane of this modification may also have a three or more-layered structure, where the electrolyte film closer to the first electrode is formed to have the lower rate of sintering shrinkage. This gives an electrolyte membrane having the high adhesion on the side closer to the first electrode and the high density on the side farther away from the first electrode. The resulting electrolyte membrane is also effectively protected from potential damage and detachment from the first electrode.

(3) In the embodiment discussed above, the first electrode 30 is used as the anode. The first electrode 30 may alternatively be used as the cathode.

(4) The compositions of the first electrode 30, the electrolyte membrane 40, and the second electrode 35 in the above embodiment are only illustrative. Diversity of other materials may be used for construction of these electrodes and electrolyte membrane. The electrolyte membrane 40 of any other composition has the similar effects to those discussed in the above embodiment by firing the two-layered structure of a first electrolyte film and a second electrolyte film.

The embodiments and their modified examples are described for the better understanding of the invention and are to be considered in all aspects as illustrative and not restrictive. There may be many modifications, changes, and alterations without departing from the scope or spirit of the main characteristics of the present invention. All such modifications and changes that come within the meaning and range of equivalency of the claims are to be embraced within their scope.

The invention claimed is:

1. A method of forming an electrolyte membrane, comprising:

forming a first layer on a first electrode formed on a porous metal support;

forming a second layer, which has a higher degree of fluidity than a degree of fluidity of the first layer, on the first layer;

firing the first layer and the second layer to form an electrolyte membrane on the first electrode formed on the porous metal support, wherein the second layer has a lower green density than a green density of the first layer, the green density being a density of a layer prior to firing, and wherein the densities of the first and second layers are changed before and after the firing.

2. The method in accordance with claim 1, wherein the higher degree of fluidity of the second layer is obtained by making the second layer of a specific material having a lower green density than a green density of a material of the first layer.

3. A method of forming an electrolyte membrane, comprising:

forming a first layer on a first electrode formed on a porous metal support;

forming a second layer, which has a higher degree of fluidity than a degree of fluidity of the first layer, on the first layer;

firing the first layer and the second layer to form an electrolyte membrane on the first electrode formed on the porous metal support, wherein the higher degree of fluidity of the second layer is obtained by forming the second layer according to a specific film formation technique that lowers green density, and wherein the densities of the first and second layers are changed before and after the firing.

4. A membrane-electrode assembly manufacturing method, comprising:

forming a first electrode on a porous metal support;

forming a first layer on the first electrode;

forming a second layer, which has a higher degree of fluidity than a degree of fluidity of the first layer, on the first layer;

firing the first layer and the second layer to complete an electrolyte membrane; and forming a second electrode on the electrolyte membrane, wherein the second layer has a lower green density than a green density of the first layer, the green density being a density of a layer prior to firing, wherein the densities of the first and second layers are changed before and after the firing, and wherein the higher degree of fluidity of the second layer is obtained by forming the second layer according to a specific film formation technique that lowers the green density.

5. A membrane-electrode assembly formed on a porous metal support, the membrane-electrode assembly comprising:

a first electrode formed on the porous metal support;

an electrolyte membrane formed on the first electrode and made by firing a first layer formed on the first electrode and a second layer formed on the first layer to have a higher degree of fluidity than a degree of fluidity of the first layer; and a second electrode formed on the electrolyte membrane, wherein the second layer has a lower green density than a green density of the first layer, the green density being a density of a layer prior to firing, wherein the densities of the first and second layers are changed before and after the firing, and wherein the higher degree of fluidity of the second layer is obtained by forming the second layer according to a specific film formation technique that lowers green density.

6. A fuel cell, comprising:

the membrane-electrode assembly in accordance with claim 5; and a pair of separators located on both ends of the membrane-electrode assembly.

* * * * *

UNITED STATES PATENT AND TRADEMARK OFFICE
CERTIFICATE OF CORRECTION

| | | |
|---|---|---|
| PATENT NO. | : 8,835,080 B2 | Page 1 of 1 |
| APPLICATION NO. | : 12/677944 | |
| DATED | : September 16, 2014 | |
| INVENTOR(S) | : Naoki Ito | |

It is certified that error appears in the above-identified patent and that said Letters Patent is hereby corrected as shown below:

On the title page, in the title, item (54), line 1, and in the Specification, Column 1, line 1, change "ELECTROLYTE MEBRANE FORMATION" to -- ELECTROLYTE MEMBRANE FORMATION --.

On the title page, in the title, item (54), line 2, and in the Specification, Column 1, line 2, change "METHOD, MEMBRANE-ELECTERODE" to -- METHOD, MEMBRANE-ELECTRODE --.

Signed and Sealed this
Second Day of June, 2015

Michelle K. Lee
*Director of the United States Patent and Trademark Office*